United States Patent [19]
Muskalla et al.

[11] Patent Number: 5,833,904
[45] Date of Patent: Nov. 10, 1998

[54] PROCESS FOR THE PRODUCTION OF BIAXIALLY STRETCHED FILMS AND APPARATUS FOR CARRYING OUT THE PROCESS

[75] Inventors: Winfried Muskalla, Eltville; Robert Schmidt, Bad Homburg; Karl-Heinz Kochem, St. Ingbert, all of Germany

[73] Assignee: Hoechst Aktiengesellschaft, Frankfurt, Germany

[21] Appl. No.: 613,154

[22] Filed: Mar. 8, 1996

[30] Foreign Application Priority Data

Mar. 10, 1995 [DE] Germany ............... 195 08 597.3

[51] Int. Cl.⁶ ............................................. B29C 41/26
[52] U.S. Cl. ............... 264/178 R; 264/400; 264/162; 264/210.2; 264/216; 264/235.8; 264/284; 264/290.2; 425/66; 425/71; 425/224; 425/385
[58] Field of Search ............... 264/210.2, 290.2, 264/235.8, 284, 178 R, 400, 216, 162; 425/224, 71, 66, 385

[56] References Cited

U.S. PATENT DOCUMENTS

| | | | |
|---|---|---|---|
| 3,491,177 | 1/1970 | Johnson | 264/348 |
| 4,370,291 | 1/1983 | Kazama et al. | 264/210.7 |
| 4,428,724 | 1/1984 | Levy | 264/348 |
| 4,803,027 | 2/1989 | Peiffer et al. | 264/210.5 |
| 4,911,874 | 3/1990 | Peiffer et al. | 264/178 |
| 4,976,908 | 12/1990 | Mizuno et al. | 264/210.2 |
| 5,100,593 | 3/1992 | Mizuno et al. | 264/216 |
| 5,215,804 | 6/1993 | Hagens et al. | 264/293 |
| 5,252,389 | 10/1993 | Schmidt et al. | 428/334 |

FOREIGN PATENT DOCUMENTS

| | | | |
|---|---|---|---|
| 36 35 302 | 4/1988 | Germany . | |
| 53-54271 | 5/1978 | Japan | 264/290.2 |
| 53-86759 | 7/1978 | Japan | 264/210.2 |

*Primary Examiner*—Jeffery R. Thurlow
*Attorney, Agent, or Firm*—Foley & Lardner

[57] ABSTRACT

In a for the production of biaxially stretched films, a take-off roll 4 is arranged downstream of a draw-off roll 3. A plastic melt is formed into an initial film by means of a slot die 1, cooled on the draw-off roll 3 and passed over the take-off roll 4 which has a predetermined surface roughness. The film is then biaxially stretched and heat-set.

23 Claims, 5 Drawing Sheets

Final Film, Example 3

Final Film, Example 7

Final Film, Example 11

Final Film, Example 15

PROCESS FOR THE PRODUCTION OF BIAXIALLY STRETCHED FILMS AND APPARATUS FOR CARRYING OUT THE PROCESS

BACKGROUND OF THE INVENTION

The present invention relates to a process for the production of biaxially stretched films from a plastic melt which is formed into a melt film by means of a slot die, cooled on a draw-off roll to give an initial film, passed over a take-off roll and then biaxially stretched and heat-set. The invention also relates to an apparatus for carrying out the process.

In the production of biaxially oriented flat films, the following process steps are usually carried out: melting of the thermoplastic polymeric starting material (extrusion), formation of a melt film by means of a slot die, cooling of the melt film to give an initial film and biaxial stretching with subsequent setting and winding of the film.

The melt film is usually cooled by means of a cooled roll (referred to below as a draw-off roll), the cooled initial film then being passed over a further roll (referred to below as a take-off roll), which is likewise generally cooled. Cooling of the take-off roll serves additionally to cool that side of the initial film which faces away from the draw-off roll, the so-called air side, in order to achieve uniform tempering of the initial film.

The temperatures of the draw-off and take-off rolls can vary within a wide range; the temperature and peripheral velocity determine (depending on the polymer type) the crystallization behavior of the generally crystalline, polymeric melts in different ways.

Described in DE-A 41 01 650 is a biaxially stretched polypropylene monofilm for use as an electrical insulating film which is characterized by different peak-to-valley heights on the surfaces of both film sides, the smoother surface being substantially fibril-free and crater-free. The shaping or configuration of the surfaces is achieved by the pretreatment of the initial film. As a result of the slow cooling of the melt film, starting from a melt temperature of about 230° C., on the draw-off roll, which has a temperature of about 90° C., $\alpha$- and $\beta$-crystal modifications, the so-called spherulites, form in the initial film. At lower draw-off roll temperatures, virtually exclusively $\alpha$-spherulites are formed. After passing through a preheating zone of from 125° to 141° C., the film is biaxially stretched, the $\beta$-spherulites undergoing a phase transformation and being converted into $\alpha$-spherulites. However, this occurs only with that side of the film which was previously heated by the entry roll of the longitudinal stretching zone to greater than or equal to 150° C., while the other film side, which had no direct contact with this roll, retains the $\beta$-spherulite structure. The transverse stretching is carried out in the usual temperature range of from 150° to 165° C. The smoother surface of the biaxially stretched polypropylene film has an average peak-to-valley height $R_z$ of $\leq 0.25$ $\mu$m, while the rougher surface has an average peak-to-valley height $R_z$ which is at least 0.02 $\mu$m greater, measured at a cut-off value of 0.08 mm. The increased roughness of the rougher side is required, inter alia, in order to avoid blocking during further processing. The disadvantage of this procedure is that, owing to the hot draw-off roll, which has a temperature of about 90° C., in particular at high machine speeds and/or in the case of thick initial films, adhesion to the downstream take-off roll occurs since that side of the initial film which faces away from the draw-off roll then does not cool sufficiently below the melting point. For example, in the case of polypropylene, this is 162° C. However, lower draw-off roll temperatures lead to an excessively low level of formation of $\beta$-spherulites and thus to excessively low surface roughness of the stretched film.

DE-A-36 20 219 discloses a process for the production of thin biaxially stretched films of polypropylene, in which that film surface which faces away from the drawoff roll, namely the air-side film surface, is passed through surrounding air at an air temperature $T_A$ greater than or equal to 30° C. and less than or equal to 200° C., and this heat treatment lasts for at least 1.5 seconds. In this way, the growth of $\beta$-spherulites can be controlled and very exactly defined and, depending on the air temperature, increased roughness values of this film side can also be obtained.

The disadvantage here is that high air temperatures $T_A$ are required in order to achieve high roughness values on the air side of the initial film, it being possible for adhesions and/or protuberances of the polypropylene film to occur on the take-off roll in the case of high machine speeds and/or large thicknesses of the initial film. In addition, it is necessary to ensure a very uniform temperature distribution over the width of the initial film and high temperature-time constancy, which requires great technical complexity, particularly in the case of air cooling.

DE-A-36 35 302 describes a process for cooling a melt film extruded from a slot die into a cooling system comprising a draw-off roll with associated water trough and a downstream after-cooling water bath, where the draw-off roll is partially immersed in the water trough. The purpose of this cooling system is to cool the initial film as rapidly and uniformly as possible.

Such a cooling system is used, for example, in the production of polypropylene films in order to promote the formation of small crystal structures by the rapid cooling of the initial film; films of high transparency or low opacity can thus be produced. However, in order to ensure the necessary processibility of these very smooth films, antiblocking agents, generally in the form of inorganic or organic pigments, such as $SiO_2$, $CaCO_3$, must be added to these films. Increased surface roughness is achieved by means of these pigments.

The disadvantage here is that the addition of such additives gives rise to further costs. If it is intended to achieve sufficiently great roughnesses without anti-blocking agents, it is necessary—as described above to—permit the formation of $\beta$ crystal structures by means of high draw-off roll temperatures. A disadvantage is that, at relatively high draw-off roll temperatures, evaporation bubbles are formed on immersion of the air side of the initial film, which side has not yet cooled below the boiling point of water, and this may lead to bubble-like protuberances on the surface of the initial film.

SUMMARY OF THE INVENTION

It is therefore an object of the present invention to provide an improved process for the production of biaxially stretched films.

It is also an object of the present invention to provide an improved process including an improved step for cooling the initial film in such a way that adhesion to the downstream take-off roll is avoided, even at elevated temperatures of the draw-off roll.

A further object of the invention is to provide an improved apparatus for carrying out the process according to the invention.

In accomplishing the foregoing objects, there has been provided according to one embodiment of the present invention a process for the production of a biaxially stretched film from a heat-plastified thermoplastic polymer, comprising: forming a melt film by extrusion; cooling the melt film on a draw-off roll to give an initial film; passing the initial film over a take-off roll having a roughened surface comprising a defined surface roughness and wherein the roughened surface has an operating temperature in the range from about 23 to 110° C.; and biaxially stretching and heat-setting the film downstream of the take-off roll.

According to another aspect of the present invention, there has been provided an apparatus for the production of a biaxially stretched film from a heat-plastified thermoplastic polymer, comprising: a slot die for forming a melt film by extrusion; a draw-off roll for cooling the melt film to give an initial film; a take-off roll having a roughened surface arranged downstream of the draw-off roll, comprising a predetermined surface roughness with a center line average value $R_a$ of from 0.3 to 1.1 µm, measured at a cut-off of 0.8 mm.

Further objects, features and advantages of the present invention will become apparent to those skilled in the art from the detailed description of preferred embodiments that follows, when considered together with the accompanying figures of drawing.

DETAILED DESCRIPTION OF THE PREFERRED EMBODIMENTS

Figure 1:
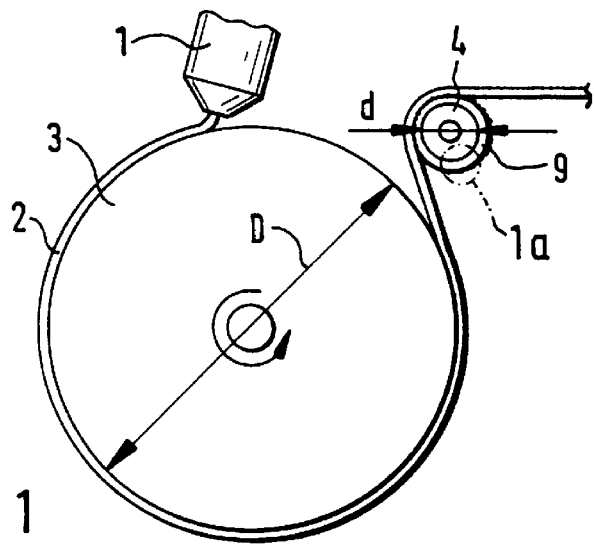
FIG. 1 is a schematic side view, in section, of a first embodiment of the apparatus according to the invention, having a draw-off roll and a take-off roll.
Figure 1A:
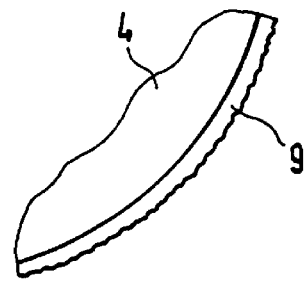
Fig. 1a is an enlarged section of the take-off roll according to FIG. 1.

According to the invention, the initial film is passed over a roughened surface of a take-off roll, having defined surface roughness, which is arranged downstream of a draw-off roll, and the roughened surface has an operating temperature in the range from 23° to 110° C.

The apparatus for carrying out the process is equipped with a slot die, a draw-off roll and a take-off roll, and the take-off roll arranged downstream of the draw-off roll has a predetermined surface roughness with a center line average value $R_a$ of from 0.3 to 1.1 µm, measured at a cut-off of 0.8 mm.

For carrying out the process, the take-off roll usually used in the production process for biaxially oriented flat films of polymeric, thermoplastic raw materials, such as, for example, polypropylene, polyethylene, polyester, in particular polyethylene terephthalate, polycarbonate, polyphenylene sulfide, polyphenylene naphthalate, polyphenylene naphthalate bibenzoate, etc., and having polished, smooth surfaces of steel, chromium, hard chromium, etc., is replaced by a roll having a randomly roughened surface whose center line average value $R_a$ (defined according to DIN 4768) at a cut-off of 0.8 mm is from 0.3 to 1.1 µm, preferably from 0.4 to 0.8 µm.

The material of the roll surface may comprise the usually used materials, i.e., steel, stainless steel, chromium, hard chromium, etc. However, it is preferable to use ceramic surface materials which are distinguished by high abrasion resistance. Such ceramics are metal oxides (e.g., chromium oxide, aluminum oxide and titanium oxide), metal nitrides (e.g., titanium nitride), metal carbides and any desired mixtures of these materials. The production of such layers is described, for example, in VDI Reports No. 965.2, 1992, the disclosure of which is incorporated by reference herein. The process now generally used in the case of relatively large workpieces, such as, for example, rolls, is the plasma spraying technique, establishment of the required surface roughness being effected by an additional grinding process after application of the ceramic layer.

It is surprising that adhesions of the initial film, which increase at high draw-off roll speeds and temperatures, can be avoided by a rough take-off roll, without the surface profile of this take-off roll leading to defects on the surface of the initial film, only when the center line average value of the surface of this roll is fixed within relatively narrow limits.

The center line average value Ra is the arithmetic mean of all deviations of the roughness profile from this center line; the center line intersects the roughness profile in such a way that the areas of the profile peaks are compensated by the areas of the profile valleys (cf. DIN 4768). At $R_a$ values (cut-off =0.8 mm) below 0.3 µm, the roughening of the surface of the take-off roll is insufficient for avoiding adhesions between the still hot surface of the initial film and the roll surface. Above $R_a$ =1.1 µm, it is not possible to avoid protuberances of the hot initial film due to its own weight which acts on the roughened roll surface and due to the tension with which the initial film is passed over the take-off roll. The Examples described below will further clarify this with reference to the production of biaxially oriented polypropylene films.

The invention is illustrated in more detail below with reference to the drawings.

The process according to the present invention is illustrated in more detail below specifically for the preferred embodiment of the production of biaxially oriented flat films of polypropylene. The principle of the process on which the invention is based can also be used for the production of biaxially oriented flat films of other thermoplastics. Specific extrusion parameters for other types of polymer films are well known to those skilled in the art.

Figure 2:
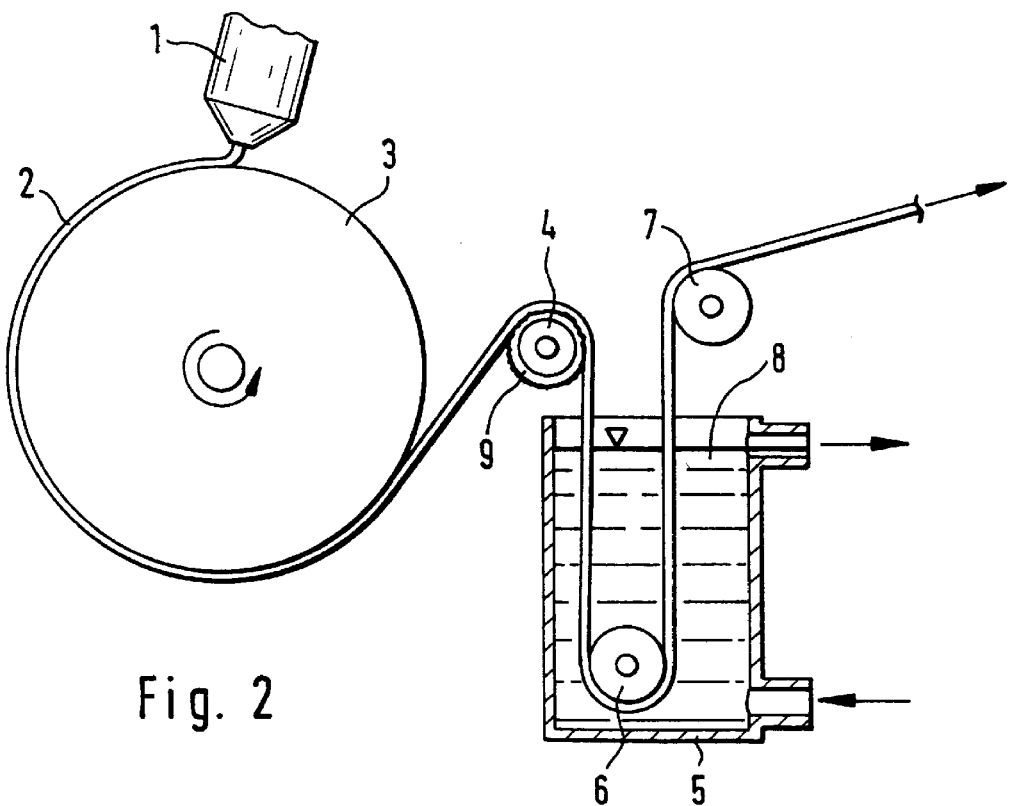
FIG. 2 is a schematic side view, in section, of a second embodiment of the apparatus according to the invention, having a cooling bath which is arranged downstream of the take-off roll.
Figure 3A:
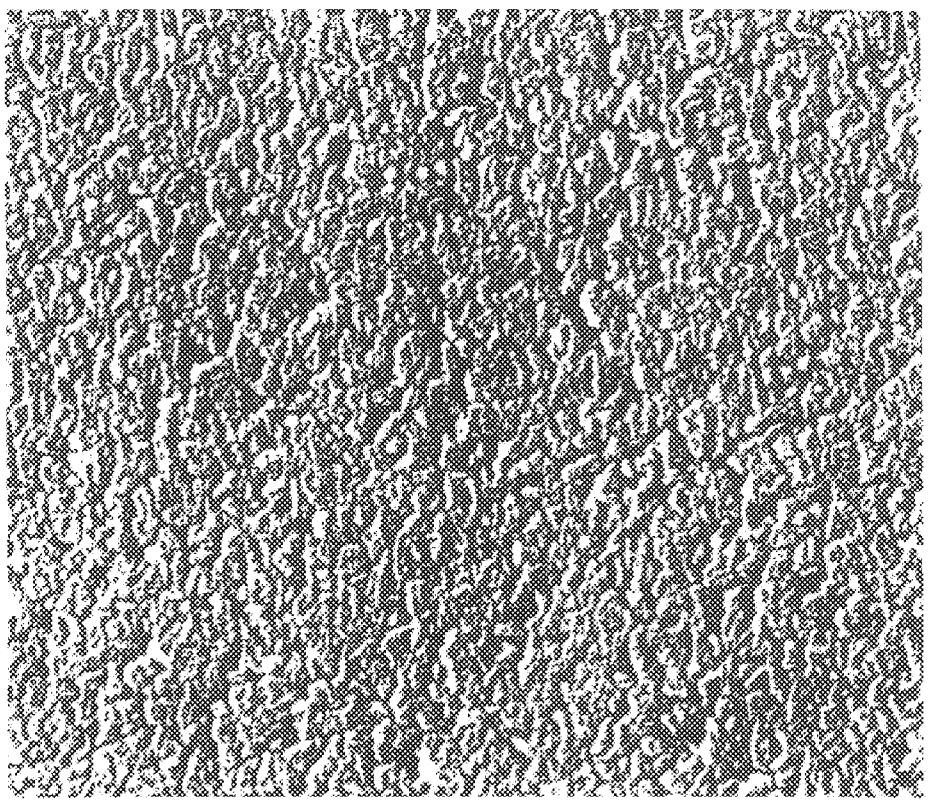
FIGS. 3a and 3b are optical micrographs of the surface of initial films in Examples 3 and 7 according to the invention, shown in 400 times magnification.
Figure 3B:
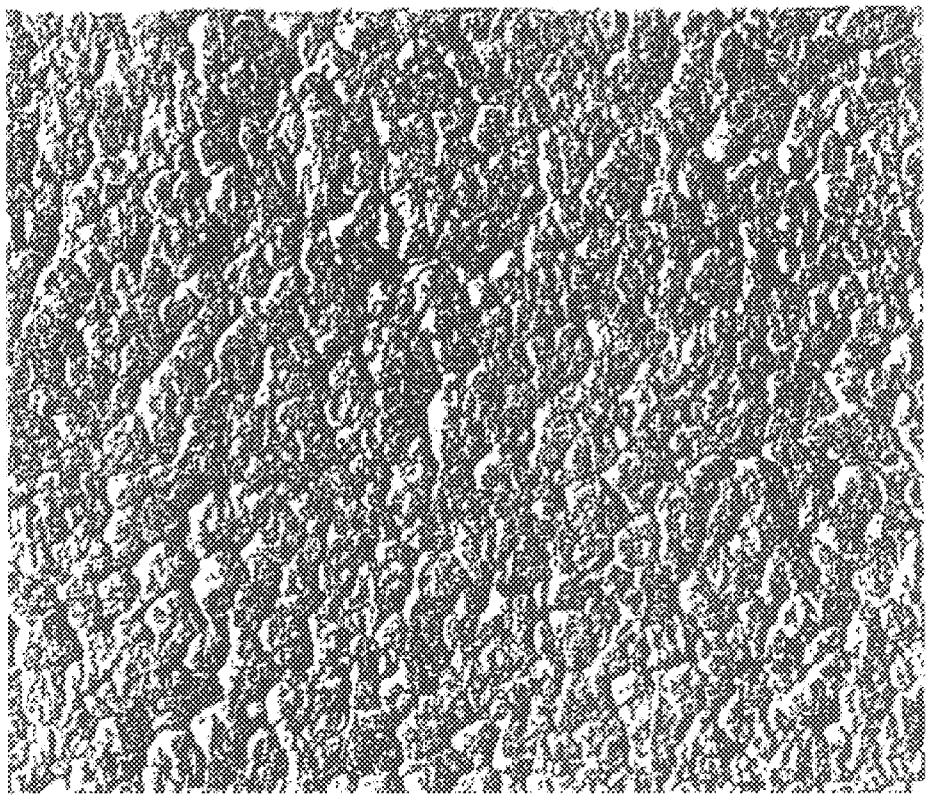
Figure 4A:
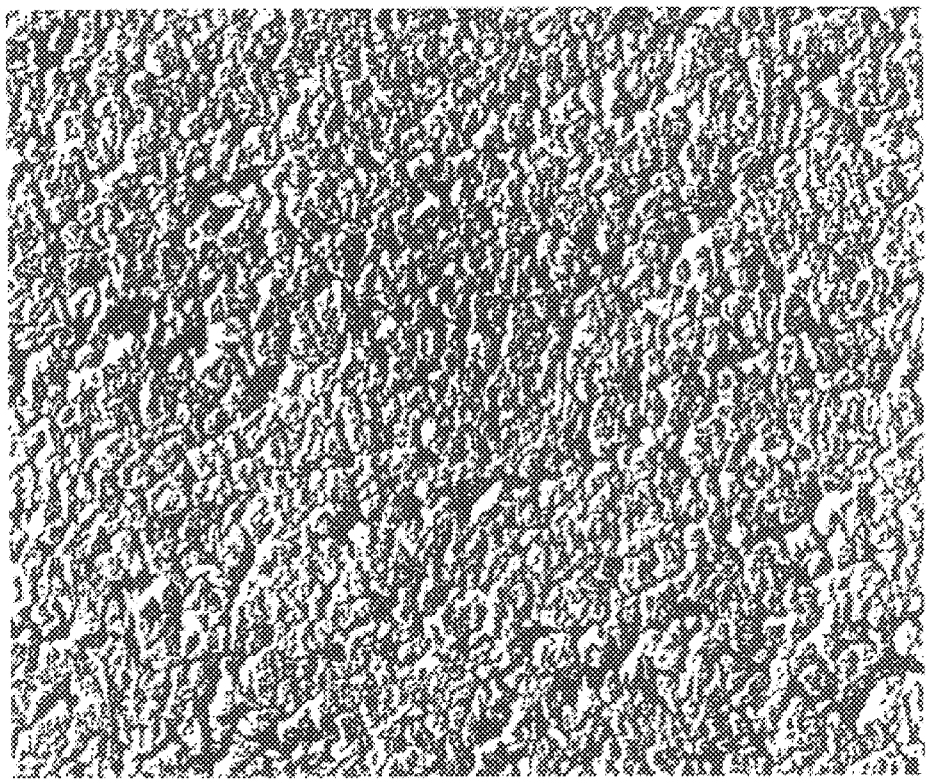
FIGS. 4a and 4b are optical micrographs of the surface of initial films in Examples 11 and 15 according to the invention, shown in 400 times magnification.
Figure 4B:
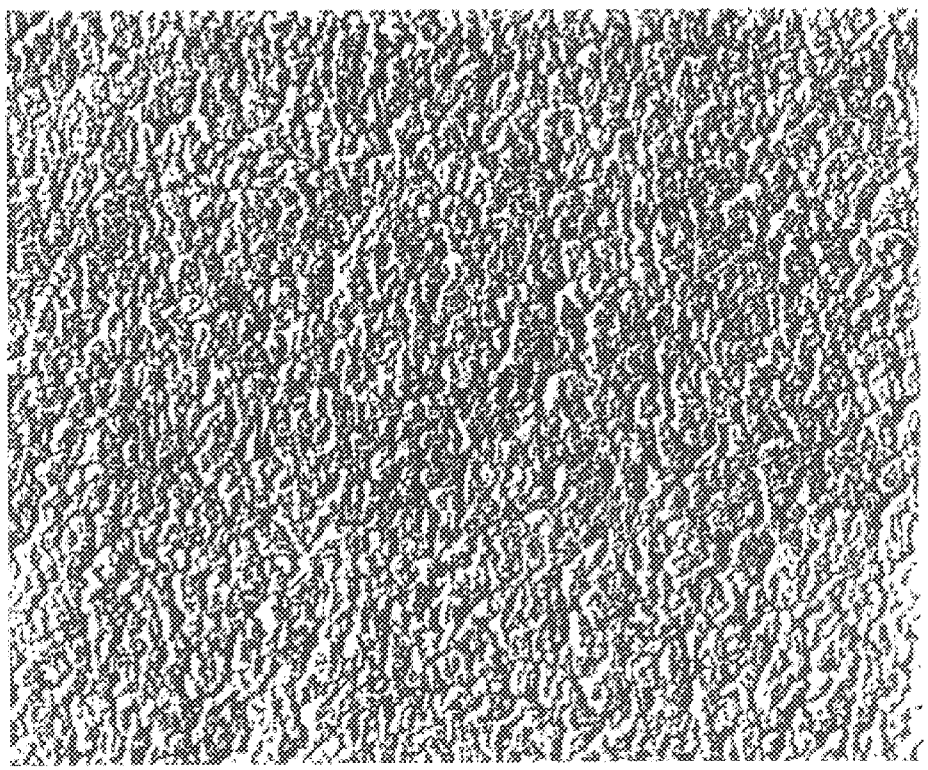
Figure 5A:
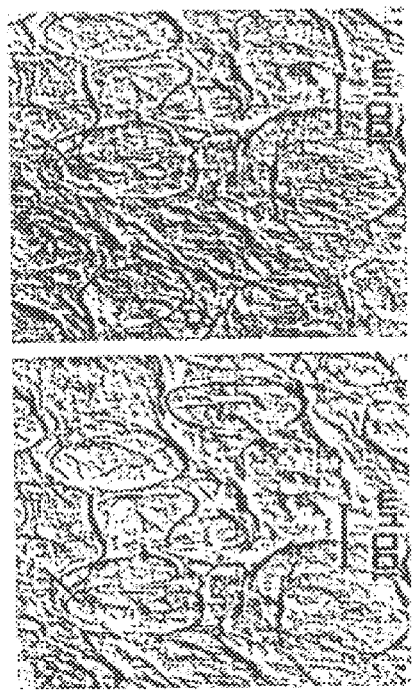
FIGS. 5a, 5b, 5c and 5d are optical micrographs of the surface of the final films produced from the initial films according to FIGS. 3 and 4, shown in 85 times magnification.
Figure 5B:
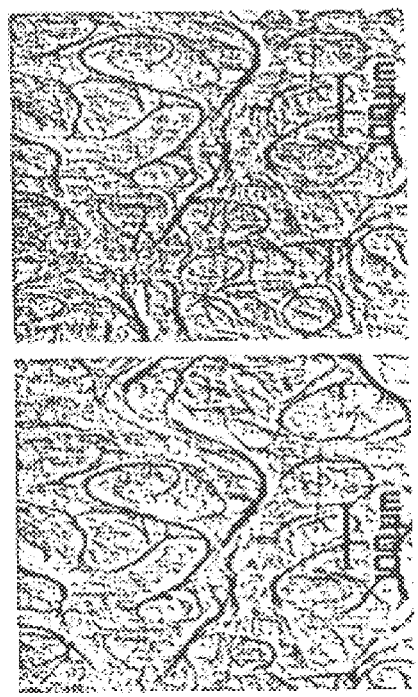
Figure 5C:
Figure 5D:
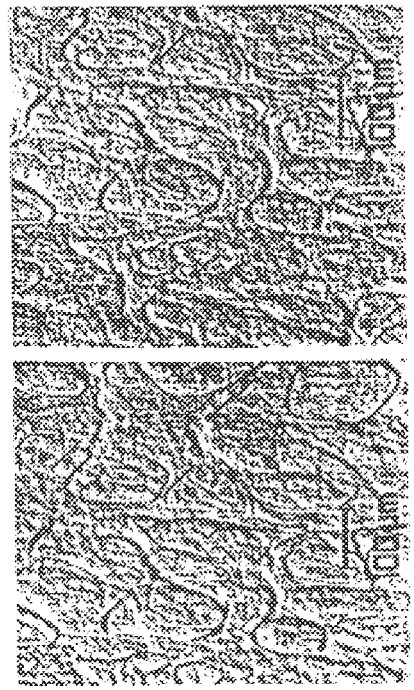

A preferred apparatus according to the invention, shown schematically in FIG. 1, has a cooling system which comprises a draw-off roll 3 and a take-off roll 4, a surface layer 9 of the take-off roll having a defined roughness and comprising a ceramic material. A melt film 2 on the circumferential surface of the draw-off roll 3, which is generally a metal surface, in particular a steel or hard chromium surface, is extruded from a slot die 1. The temperature T of the melt film of polypropylene immediately after emergence from the slot die 1 is from 220° to 300° C., in particular from 250° to 270° C. The temperature of the draw-off roll is from 40° to 105° C., in particular from 70° to 100° C. After cooling of the initial film, whose thickness may be from 150 to 3000 μm, in particular from 250 to 1000 μm, the film is passed over the take-off roll 4. The take-off roll 4 may be at room temperature 23° C. or may be thermostated to provide a pre-set temperature above room temperature. For example, operating temperatures of the roll surface of from 40° to 110° C., preferably from 70° to 100° C., may be established in the case of the production of polypropylene films. However, the roll surface need not be thermostated, in which case a surface temperature which is essentially determined by the surface temperature of the initial film cooled on the draw-off roll 3 results. Particularly when the roughness of the final film is not to be established by means of the addition of special organic or inorganic pigments but via crystallization of the polypropylene melt, temperatures of from 70° to 110° C. are required, both on the draw-off roll and on the take-off roll, in order to ensure sufficient growth of the α and β crystal modifications of the polypropylene. After leaving the take-off roll, a cooling bath may be present downstream, as shown in FIG. 2, for further homogeneous cooling of the initial film. The coolant temperature is adjusted to about 20° C. to about 95° C., as required. The film passes through the cooling medium 8, for example water, and is passed over a deflecting roll 6 and, after leaving the water bath, over a further deflecting roll 7. In the further course of the process in the production of the biaxially oriented polypropylene film, the film, which up to this point has not yet been stretched, enters a conventional longitudinal stretching unit (not shown) after passing through a preheating zone at from 125° to 145° C. The longitudinal stretching is carried out at temperatures of from 120° to 165° C. and with a longitudinal stretching ratio of from 1:4 to 1:7.0, preferably from 1:4 to 1:6.0. The longitudinally stretched film then enters a conventional transverse stretching frame (not shown) and is stretched in the transverse direction in a ratio of from 1:8 to 1:12, preferably from 1:8 to 1:10.5. The transverse stretching and the heat-setting are carried out at from 150° to 180° C., in particular from 155° to 165° C.

In the Examples described below, the following production conditions were maintained for all films:

| | |
|---|---|
| Extrusion temperature | 275° C. |
| Draw-off roll diameter | 600 mm |
| Take-off roll diameter | 100 mm/133 mm |
| Longitudinal stretching temperature | 153° C. |
| Longitudinal stretching ratio $\lambda_L$ | 6.0 |
| Transverse stretching temperature | 165° C. |
| Transverse stretching ratio $\lambda_t$ | 8.2 |
| Heat-setting temperature | 155° C. |

The production of the films of the following Examples and Comparative Examples was carried out on an experimental machine for the production of biaxially stretched PP films.

EXAMPLES 1 to 16

The aim of Examples 1 to 16 described below is to avoid adhesions of the initial film—and hence defects on the final film—by the use of take-off rolls having rougher surfaces in comparison with the usual polished hard metal surfaces of take-off rolls, as are used in the Comparative Examples.

To determine the effect of a rough take-off roll surface on the surface characteristics of initial and final films, take-off rolls having a ground ceramic surface of defined roughness were used. Table 1 shows the take-off rolls (diameter 133 mm) which are used in Experiments 1 to 16. These preferred embodiments have surfaces of chromium oxide, aluminum oxide and titanium oxide and of mixtures of such oxides.

TABLE 1

Ceramic rolls used

| Experiment No. | Roll type | Pretreatment | Material (Surface) | Roughness $R_a$ (cut-off 0.8 mm) |
|---|---|---|---|---|
| 1–4 | Ceramic | Ground | $Al_2O_3$ + 3% $TiO_2$ | 0.3 |
| 5–9 | Ceramic | Ground | $Cr_2O_3$ | 0.6 |
| 10–13 | Ceramic | Ground | $Cr_2O_3$ | 1.1 |
| 14–16 | Ceramic | Laser-engraved | $C_2O_3$ | 1.7 |

The final roughness of the roll surfaces was produced either by a grinding process (diamond-containing grinding wheels) or by laser engraving. Various initial and final film thicknesses and various draw-off speeds were realized, and the tendency to stick at high draw-off and take-off roll temperatures was checked visually, the take-off rolls not being thermostated. The effective temperatures on draw-off and take-off rolls were measured by means of a contact thermometer.

Table 2 gives an overview of the test parameters and the results. These show that a center line average value $R_a$ of 0.3 μm (Experiments 1 to 4) for the surface of the take-off roll is sufficient for avoiding adhesion, with the exception of an edge area on each side of the initial films, in the entire thickness range of the initial films investigated (400–1300 μm). In the case of an initial film width of 260 mm, the edge area in which isolated adhesions are found covers about 15 mm on either side. In this zone, the initial film is about 10 to 20% thicker than the middle zone, owing to a not completely uniform distribution of the polypropylene melt material on emergence from the slot die.

This thickening of the edges leads to the slight adhesion of the edge areas, but such films are in fact in a satisfactory state, since the edge areas are in any case cut off during trimming of the film.

TABLE 2

Test parameters and visual assessment of adhesion points on the initial film, using take-off rolls having ceramic surfaces (see Table 1)

| Experiment No. | Extruder T °C. | Extruder N rpm | Draw-off roll V m/min | Draw-off roll T(°C.) $T_M$ | Draw-off roll T(°C.) $T_O$ | Take-off roll T(°C.) $T_M$ | Take-off roll T(°C.) $T_O$ | T film (°C.) after take-off roll Air side | T film (°C.) after take-off roll Roll side | Thicknesses Initial film/final film (μm) | Result (Visual assessment of the adhesion points) |
|---|---|---|---|---|---|---|---|---|---|---|---|
| 1  | 275 | 60 | 12 | 100 | 112 | 1* | 94  | 110 | 111 | 400/5.9    | No adhesion, except for edge |
| 2  | "   | "  | 8  | "   | 108 |    | 96  | 110 | 118 | 650/9.5    | " |
| 3  | "   | "  | 6  | "   | 109 |    | 98  | 116 | 112 | 850/12.5   | " |
| 4  | "   | "  | 4  | "   | 107 |    | 97  | 110 | 110 | 1300/19.1  | " |
| 5  | "   | "  | 12 | "   | 113 |    | 107 | 114 | 118 | 400/6.4    | No adhesions |
| 6  | "   | "  | 8  | "   | 114 |    | 106 | 109 | 116 | 650/10.3   | " |
| 7  | "   | "  | 6  | "   | 112 |    | 108 | 109 | 114 | 850/13.5   | " |
| 8  | "   | 80 | 6  | "   | 114 |    | 108 | 116 | 122 | 1200/19.1  | Slight adhesion at the edge |
| 9  | "   | 60 | 4  | "   | 112 |    | 107 | 106 | 113 | 1300/20.6  | " |
| 10 | "   | "  | 8  | "   | 120 |    | 97  | 112 | 115 | 650/9.2    | No adhesion |
| 11 | "   | "  | 6  | "   | 110 |    | 98  | 110 | 116 | 850/12.0   | " |
| 12 | "   | 80 | 6  | "   | 116 |    | 104 | 112 | 124 | 1200/17.0  | Slight adhesion at the edge |
| 13 | "   | 60 | 4  | "   | 111 |    | 96  | 113 | 117 | 1300/18.4  | " |
| 14 | "   | "  | 8  | "   | 111 |    | 93  | 110 | 115 | 650/9.2    | No adhesion |
| 15 | "   | "  | 6  | "   | 112 |    | 94  | 110 | 116 | 850/12.0   | Slight adhesion at the edge |
| 16 | "   | 80 | 6  | "   | 118 |    | 107 | 116 | 124 | 1200/17.0  | Adhesion over the width |

$T_M$ = Temperature of the cooling medium
$T_O$ = Operating temperature of the roll surface
1* Roll was not thermostated (without coolant)

FIGS. 3a, 3b, 4a, 4b, 5a, 5b, 5c and 5d show optical micrographs of the surface of initial and final films. In each case, samples from the edge areas of the initial and final films are shown. The thickness of 850 μm of the initial film is in each case the same for the samples from Examples 3, 7, 11 and 15 which are shown. The micrographs show substantially reduced surface defects compared with the films from Comparative Examples V1 to V4, since at most slight adhesion occurs at the edge on the take-off roll, without the usefulness of the films being impaired in any way.

The results of Examples 5 to 9 were obtained using a ceramic-coated $Cr_2O_3$ take-off roll which has an $R_a$ value of 0.6 μm at a cut-off of 0.8 mm. Up to a thickness of 850 μm of the initial film, no defects which could be attributed to adhesions to the take-off roll were found over the entire width of the initial film. The take-off roll was not heated or cooled. The surface temperature of the take-off roll was from 106 to 108° C. during the experiment (contact thermometer). At thicknesses of 1200 μm and 1300 μm of the initial film, adhesions were found in the edge area.

The usual production speeds and the speeds of the draw-off rolls range from 20 to 60 m/min.

The thickness of polypropylene initial film is in general from 150 to 1000 μm, and the thickness of the final film is from 3 to 21 μm in production. The preferred roll diameter D of the draw-off roll is, for example, 1100 mm, while the roll diameter d of the take-off roll may be from 100 to 600 mm.

In the case of Examples 10 and 11, in which the $R_a$ value of the take-off roll was 1.1 μm, adhesions were no longer found even in the edge area. Here too, adhesions occurred in the edge area only in the case of very large thicknesses of the initial film (Examples 12 and 13).

Even in the case of higher roughness values ($R_a$=1.7 μm) of the roll surface according to Examples 14 to 16, adhesions were substantially avoided at small thicknesses of 650 μm and 850 μm of the initial film. However, slight "adhesion" occurred in the edge area at thicknesses of 850 μm of the initial film, and adhesions or protuberances occurred over the entire width at 1200 μm, and it is therefore not practical to use a takeoff roll having a roughness value $R_a$ =1.7 μm, although for some applications such a take-off roll is entirely satisfactory.

Comparative Examples V1 to V4

The films of the Comparative Examples were produced using an unroughened take-off roll 4.

As shown in FIG. 1, a melt film or the so-called initial film 2 is first extruded from the slot die 1 onto the surface of the draw-off roll 3. The material of the surface of this roll comprises polished hard chromium having a center line average value $R_a$ (cut-off 0.8 mm) of 0.03 μm, which is at least a factor 10 smaller than in the case of a roughened roll surface. The temperature of the draw-off roll is adjusted to 100° C. After leaving the draw-off roll, the cooled initial film passes, as shown in FIG. 1, to the take-off roll 4, which is not thermostated for these Experiments. Analogously to the surface of the draw-off roll, the surface of the take-off roll comprises polished hard chromium having a center line average value $R_a$ (cut-off 0.8 mm) of likewise 0.03 μm. The diameter of the take-off roll is 100 mm. In the Experiments, the draw-off speed was varied in the range from 4 to 8 m/min at thicknesses of from 650 to 1300 μm of the initial film. The surface temperature of the draw-off and take-off rolls was measured by means of a contact thermometer, in each case shortly after raising the initial film. The temperature of the initial film immediately after leaving the take-off roll was determined in the same manner.

After leaving the take-off roll, the cooled initial film enters the air-heating box (preheating zone), which is not shown, and then the longitudinal and transverse stretching zones, in which the above-mentioned production conditions for the biaxial stretching of the initial film are established. The thickness of the final film is from 13 to 25 μm.

Table 3 lists the essential test parameters and the visual assessment, in the Comparative Examples, of the adhesions of the initial films, which adhesions form owing to the hot surface of the initial film on the smooth surface of the take-off roll.

Figure 6:
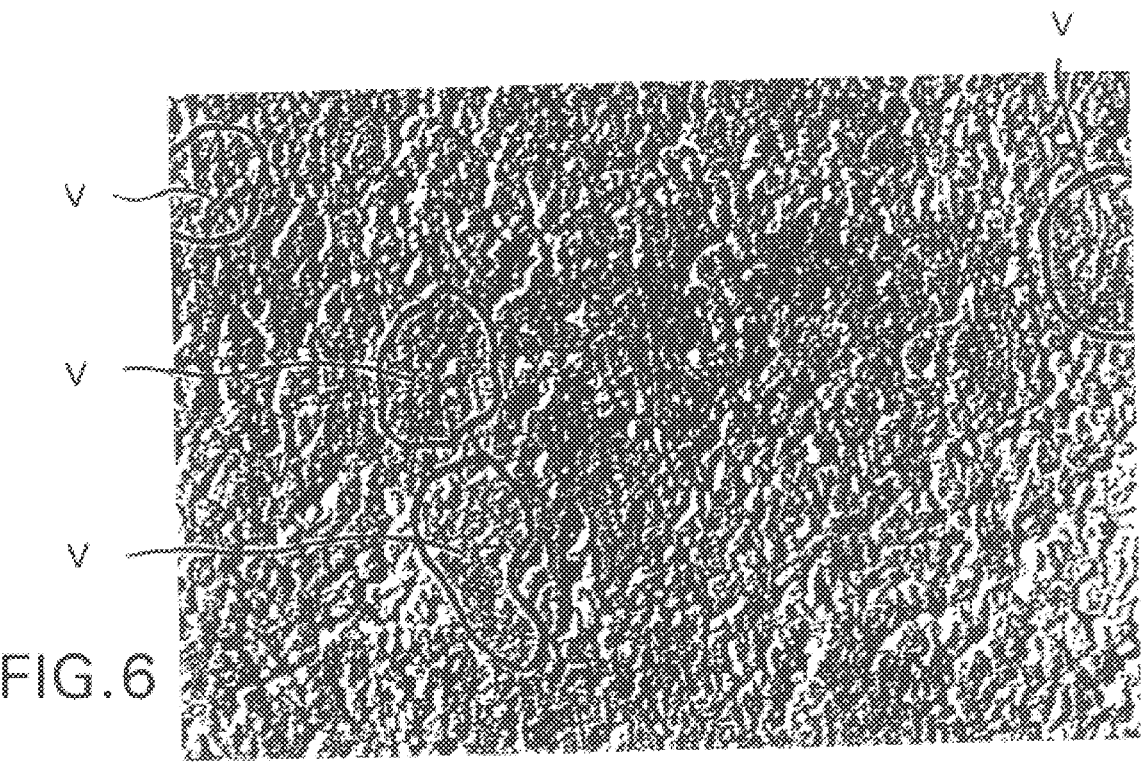
FIG. 6 is an optical micrograph of the surface of an initial film according to a Comparative Example V2, shown in 400 times magnification.

With increasing thickness of the initial film, which is associated with a higher temperature of the surface of the initial film, there is an increase in the number and the extent of adhesions on that side of the initial film (air side of the initial film) which is directly in contact with the surface of the take-off roll. FIG. 6 shows an optical micrograph of the surface of the initial film (air side) according to Comparative Example V2 after leaving the take-off roll, under 400 times magnification. Extensive defects formed as a result of adhesion and are clearly detectable (marked by a V).

Figure 7:
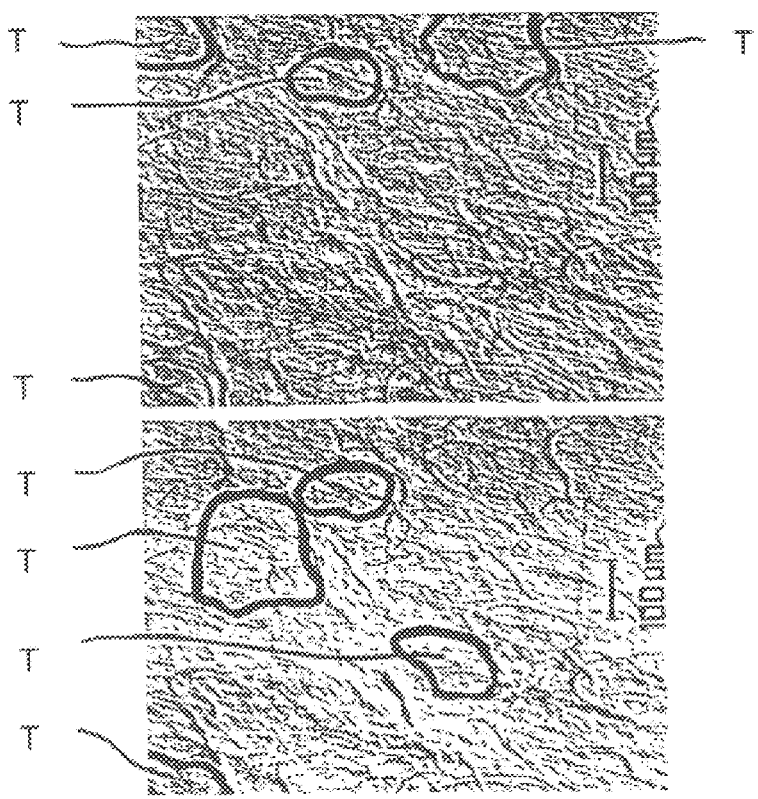
FIG. 7 is an optical micrograph of the surface of the final film produced from the initial film according to FIG. 6, shown in 85 times magnification.

In the biaxially stretched final film, this leads to substantial surface inhomogeneities in the void structure (cf. FIG. 7 under 85 times magnification). These defects are evident visually as opaque inhomogeneities and are marked by a T in FIG. 7.

said take-off roll comprising a thermostat which is adapted to control the temperature on the surface of the take-off roll in the range of 230° to 110° C.

3. A process as claimed in claim 1, wherein the center line average value $R_a$ is in the range from about 0.4 to 0.8 $\mu$m.

4. A process as claimed in claim 1, wherein, after the draw-off roll, the initial film is passed through a water bath before it is biaxially stretched and heat-set.

5. A process as claimed in claim 1, wherein the roughened surface comprises a ceramic layer.

6. A process as claimed in claim 1, wherein the surface of the ceramic layer is roughened by grinding or laser engraving.

7. A process as claimed in claim 1, wherein the roughened surface comprises a metal surface which is roughened by sand blasting.

8. A process as claimed in claim 1, wherein the operating temperature of the surface of the take-off roll is from about 70° to 110° C.

TABLE 3

Test parameters and visual assessment of adhesion points on the initial film

| | Extruder | | Draw-off roll | | | Take-off roll | | | T film (°C.) | | Thicknesses of initial | Result |
|---|---|---|---|---|---|---|---|---|---|---|---|---|
| Experi- | T | N | V | T(°C.) | | | T(°C.) | | Air | Roll | film | (Visual assessment of the |
| ment No. | °C. | rpm | m/min | $T_M$ | $T_O$ | Type | $T_M$ | $T_O$ | side | side | ($\mu$m) | adhesion points) |
| V1 | 275 | 60 | 8 | 100 | 110 | Chromium roll | 1* | 98 | 107 | 114 | 650 | Adhesion at the edge |
| V2 | " | 60 | 6 | " | 110 | Chromium roll | | 100 | 108 | 116 | 850 | Adhesion in middle and at edge |
| V3 | " | 80 | 6 | " | 114 | Chromium roll | | 100 | 114 | 120 | 1200 | Adhesion over the width |
| V4 | " | 60 | 4 | " | 112 | Chromium roll | | 102 | 110 | 117 | 1300 | Adhesion over the width |

$T_M$ = Temperature of the cooling medium
$T_O$ = Operating temperature of the roll surface
1* = Roll was not thermostated (without coolant)

What is claimed is:

1. A process for the production of a biaxially stretched film from a plastic melt, comprising:

forming a melt film by extrusion;

cooling the melt film on a draw-off roll to give an initial film of a thickness in the range from about 150 to 1,200 $\mu$m, said initial film having an air side;

passing the initial film from the draw-off roll over a take-off roll, whereby the air side of the initial film contacts a roughened surface of the take-off roll, said roughened surface having a defined surface roughness such that a center line average value $R_s$ is in the range from about 0.3 to 1.1 $\mu$m, measured at a cut-off of 0.8 mm, and wherein the roughened surface has an operating temperature in the range from about 23° to 110°C.; and biaxially stretching and heat-setting the film downstream of the take-off roll.

2. An apparatus for the production of a biaxially stretched film from a plastic melt, comprising:

a slot die for forming a melt film by extrusion;

a draw-off roll onto which the melt film is extruded for cooling the melt film to give an initial film;

a take-off roll having a roughened surface arranged downstream of the draw-off roll, comprising a predetermined surface roughness with a center line average value $R_a$ of from 0.3 to 1.1 $\mu$m, measured at a cut-off of 0.8 mm, 9. A process as claimed in claim 1, wherein the initial film is transported over the take-off roll at a speed of from about 4 to 60 m/min.

10. A process as claimed in claim 9, wherein the transport speed of the initial film over the take-off roll is from about 20 to 60 m/min.

11. A process as claimed in claim 1, wherein the initial film exits from the take-off roll with a thickness in the range from about 150 to 1000 $\mu$m.

12. A process as claimed in claim 1, wherein the initial film is biaxially stretched to give a final film having a thickness of from about 3 to 21 $\mu$m.

13. A process as claimed in claim 5, wherein said ceramic surface is applied to the surface of the take-off roll by plasma spraying and wherein the defined surface roughness is established by grinding.

14. An apparatus as claimed in claim 2, wherein the center line average value $R_a$ of the surface roughness of the take-off roll is from about 0.4 to 0.8 $\mu$m.

15. An apparatus as claimed in claim 2, wherein the take-off roll has a ceramic surface layer which is applied to the take-off roll by plasma spraying of a ceramic material, and wherein the ceramic surface layer is ground to produce the roughened surface.

16. An apparatus as claimed in claim 15, wherein the ceramic material is selected from the group consisting of a metal oxide, a metal nitride, a metal carbide and a mixture thereof.

17. An apparatus as claimed in claim 16, wherein the ceramic material comprises chromium oxide, aluminum oxide, titanium oxide or a mixture of aluminum oxide, chromium oxide and titanium oxide.

18. An apparatus as claimed in claim 16, wherein the ceramic material comprises titanium nitride.

19. An apparatus as claimed in claim 2, wherein the take-off roll comprises a ceramic surface layer which is roughened to a predetermined surface roughness by means of laser engraving.

20. An apparatus as claimed in claim 2, further comprising a cooling bath arranged downstream of the take-off roll, through which the initial film passes, and a unit for longitudinally and transversely stretching the film downstream of said cooling bath.

21. An apparatus as claimed in claim 20, wherein the cooling bath comprises a deflecting roll for reversing the direction of travel of the film, and which further comprises, after the cooling bath, a second deflecting roll for the film upstream of the longitudinal and transverse stretching unit.

22. An apparatus as claimed in claim 2, wherein the roll diameter d of the take-off roll is smaller than the roll diameter D of the draw-off roll.

23. An apparatus as claimed in claim 22, wherein the ratio of the roll diameters D/d is from 1.6 to 6.0.

\* \* \* \* \*